United States Patent
Tomaru et al.

(10) Patent No.: US 11,079,850 B2
(45) Date of Patent: Aug. 3, 2021

(54) INPUT APPARATUS

(71) Applicants: DENSO CORPORATION, Kariya (JP); DENSO TEN Limited, Kobe (JP)

(72) Inventors: Tetsuya Tomaru, Kariya (JP); Tatsuya Yamaguchi, Kobe (JP)

(73) Assignees: DENSO CORPORATION, Kariya (JP); DENSO TEN LIMITED, Kobe (JP)

( * ) Notice: Subject to any disclaimer, the term of this patent is extended or adjusted under 35 U.S.C. 154(b) by 0 days.

(21) Appl. No.: 16/798,627

(22) Filed: Feb. 24, 2020

(65) Prior Publication Data
US 2020/0278751 A1    Sep. 3, 2020

(30) Foreign Application Priority Data

Mar. 1, 2019  (JP) .............................. JP2019-037739

(51) Int. Cl.
| | |
|---|---|
| *G06F 3/01* | (2006.01) |
| *G06F 3/0482* | (2013.01) |
| *G06F 3/0488* | (2013.01) |
| *G06F 3/0354* | (2013.01) |
| *G06F 3/044* | (2006.01) |

(52) U.S. Cl.
CPC ............ *G06F 3/016* (2013.01); *G06F 3/0482* (2013.01); *G06F 3/04886* (2013.01); *G06F 3/03547* (2013.01); *G06F 3/0446* (2019.05)

(58) Field of Classification Search
CPC .... G06F 3/016; G06F 3/0482; G06F 3/04886; G06F 3/0446; G06F 3/03547
See application file for complete search history.

(56) References Cited

U.S. PATENT DOCUMENTS

| | | | | |
|---|---|---|---|---|
| 9,535,594 | B1* | 1/2017 | Alonso Ruiz ....... | H04M 1/7253 |
| 2010/0207895 | A1* | 8/2010 | Joung ................... | G06F 3/0416 |
| | | | | 345/173 |
| 2011/0248916 | A1* | 10/2011 | Griffin ................... | G06F 3/016 |
| | | | | 345/157 |
| 2012/0256858 | A1* | 10/2012 | Sudo ...................... | G06F 3/018 |
| | | | | 345/173 |

(Continued)

FOREIGN PATENT DOCUMENTS

| | | |
|---|---|---|
| JP | 2017-130021 A | 7/2017 |
| JP | 2019-200587 A | 11/2019 |

*Primary Examiner* — Beau D Spratt
(74) *Attorney, Agent, or Firm* — Harness, Dickey & Pierce, P.L.C.

(57) ABSTRACT

In an input apparatus, under a state where contact of a manipulating body to a predetermined position on a manipulation surface is detected, a second low frictional force between the manipulation surface and the manipulating body is provided by vibrating the manipulation surface. The second low frictional force is smaller than a frictional force between the manipulation surface and the manipulating body when the manipulation surface is not vibrated. In response to determining the movement of the manipulating body from the predetermined position towards a target position on the manipulation surface, a first low frictional force between the manipulation surface and the manipulating body is provided by a predetermined time by vibrating the manipulation surface. The first low frictional force is smaller than the second low frictional force.

18 Claims, 16 Drawing Sheets

(56) References Cited

U.S. PATENT DOCUMENTS

| | | | |
|---|---|---|---|
| 2014/0062927 A1* | 3/2014 | Hirose | G06F 3/016 345/173 |
| 2014/0237420 A1* | 8/2014 | Song | G06F 3/04845 715/790 |
| 2014/0267065 A1* | 9/2014 | Levesque | G06F 3/0488 345/173 |
| 2016/0162092 A1* | 6/2016 | Kukimoto | G06F 3/016 345/173 |
| 2016/0349847 A1* | 12/2016 | Sugiura | G06F 3/016 |
| 2017/0329406 A1* | 11/2017 | Dabic | G06F 3/016 |
| 2018/0081443 A1* | 3/2018 | Morofuji | G06F 3/016 |

* cited by examiner

ROTATION MANIPULATION DISPLAY SCREEN

ROTATION MANIPULATION TOUCH PAD

FIG. 7A MOVE SLOW
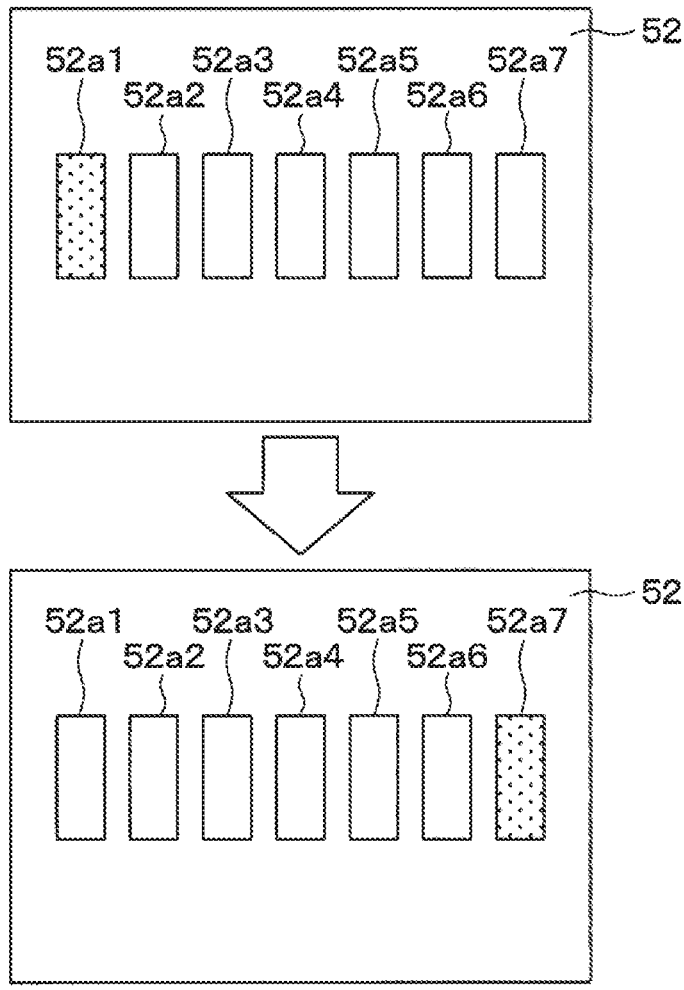
FIG. 7B MOVE SLOW
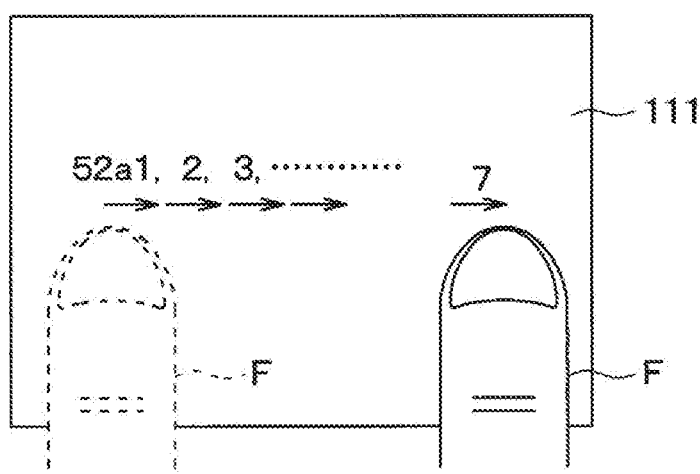

MOVE FAST

MOVE FAST

SETTING EXAMPLE 1 OF FRICTION

SETTING EXAMPLE 2 OF FRICTION

SETTING EXAMPLE 3 OF FRICTION

INPUT APPARATUS

CROSS REFERENCE TO RELATED APPLICATION

The present application claims the benefit of priority from Japanese Patent Application No. 2019-37739 filed on Mar. 1, 2019. The entire disclosure of the above application is incorporated herein by reference.

TECHNICAL FIELD

The present disclosure relates to an input apparatus, such as a touch pad or a touch panel, which enables an input manipulation with a manipulating body such as a finger.

BACKGROUND

There is known an input apparatus provided at a position separate from the position of a display apparatus; the input apparatus includes (i) a touch pad for detecting a manipulating position of the finger on a manipulation surface, (ii) an actuator, and (iii) a controller. The actuator vibrates the manipulation surface based on the detection result by the touch pad and controls a frictional force between the finger and the manipulation surface. The controller controls an operation of the actuator. The input apparatus can be configured to perform an input to an icon by performing a finger manipulation to an icon (i.e., manipulation button) displayed on the display apparatus on the touch pad.

In the area on the touch pad, a part corresponding to the icon on the display apparatus is defined as a target area, and a part corresponding to the periphery of the icon is defined as a peripheral area. Then, the finger moves on the manipulation surface of the touch pad while passing from the area other than the peripheral area (which may also be referred to as a non-peripheral area) via the peripheral area to the target area; in such a case, when the finger is moving on the peripheral area, the controller operates the actuator to generate vibration.

When the finger is moving on an area other than the peripheral area, the controller does not operate the actuator. In this case, there is no vibration on the manipulation surface; a predetermined frictional force is thereby generated between the finger and the manipulation surface. In addition, when the finger passes through the peripheral area, an air film called a squeeze film is generated between the finger and the manipulation surface due to the generation of the vibration described above. The frictional force of the finger against the manipulation surface when the vibration is generated is decreased from that when no vibration is generated. That is, the moving speed of the finger on the oscillating manipulation surface is larger than that when not oscillating. Thereafter, when the finger moves within the target area, the controller does not generate vibration on the manipulation surface. Thus a predetermined frictional force is generated between the finger and the manipulation surface.

Therefore, when the manipulator performs a finger manipulation so as to pass from the non-peripheral area to the target area through the peripheral area, the input apparatus is configured to reduce the frictional force in the peripheral area, and remind the manipulator of a "feeling of pulling-in" such that a finger is pulled toward the target area.

SUMMARY

According to an example of the present disclosure, an input apparatus may be provided as follows. Under a state where contact of a manipulating body to a predetermined position on a manipulation surface is detected, a second low frictional force between the manipulation surface and the manipulating body is provided by vibrating the manipulation surface. The second low frictional force is smaller than a frictional force between the manipulation surface and the manipulating body when the manipulation surface is not vibrated. In response to determining the movement of the manipulating body from the predetermined position towards a target position on the manipulation surface, a first low frictional force between the manipulation surface and the manipulating body is provided by a predetermined time by vibrating the manipulation surface. The first low frictional force is smaller than the second low frictional force.

BRIEF DESCRIPTION OF DRAWINGS

The objects, features and advantages of the present disclosure will become more apparent from the following detailed description made with reference to the accompanying drawings. In the drawings:

FIG. 7A is an explanatory diagram showing an example of changing a selection state of the manipulation buttons on the display screen by slowly moving the finger;

FIG. 7B is an explanatory diagram showing a finger movement state on the touch pad corresponding to FIG. 7A;

DETAILED DESCRIPTION

The following will describe several embodiments for carrying out the present disclosure with reference to the drawings. In each embodiment, portions corresponding to the elements described in the preceding embodiments are denoted by the same reference signs, and redundant explanation may thereby be omitted. When only a part of a configuration is described in an embodiment, another preceding embodiment may be applied to the other part of the configuration. It may be possible not only to combine parts the combination of which is explicitly described in an embodiment, but also to combine parts of respective embodiments the combination of which are not explicitly described if any obstacle does not especially occur in combining the parts of the respective embodiments.

First Embodiment

Figure 1:
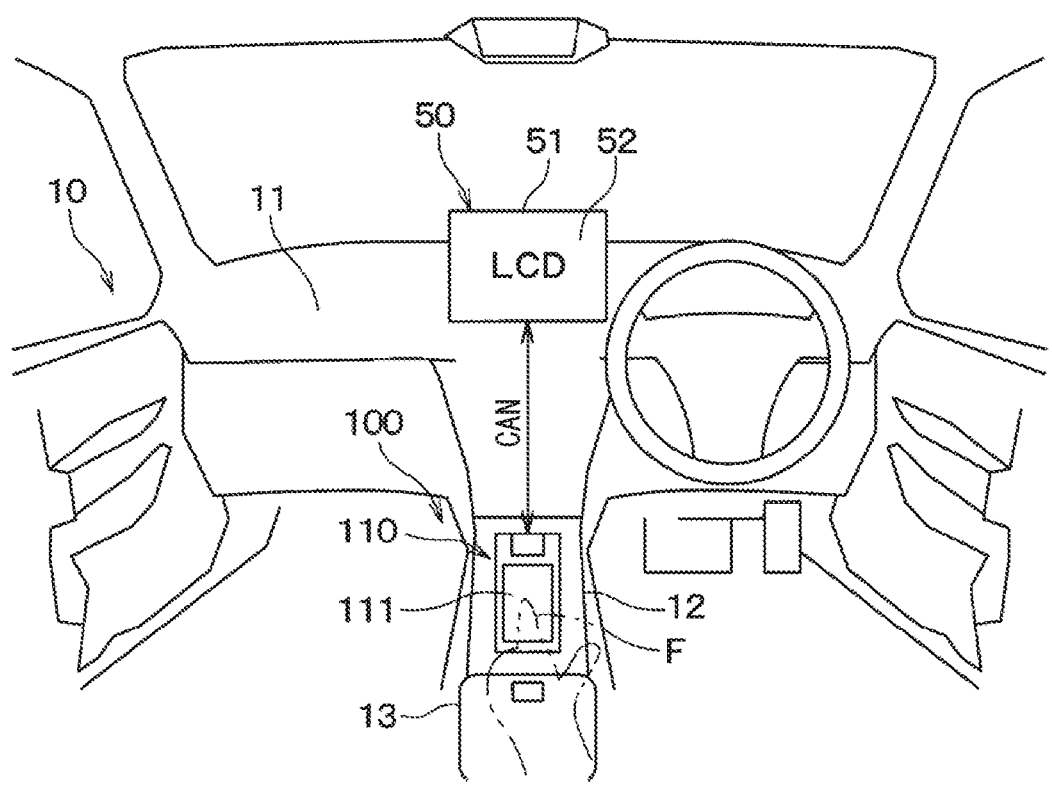
FIG. 1 is an explanatory diagram showing a mounting state of an input apparatus in a vehicle.

An input apparatus 100 according to a first embodiment will be described with reference to FIGS. 1 to 4. The input apparatus 100 of the present embodiment is applied to a remote manipulation apparatus for manipulating a navigation apparatus 50, for example. As shown in FIG. 1, the input apparatus 100 is mounted on a vehicle 10 together with the navigation apparatus 50, for example.

First, the navigation apparatus 50 mounted on the vehicle 10 together with the input apparatus 100 will be briefly described.

The navigation apparatus 50 is a route guidance system that displays the current position information of the vehicle on the map, traveling direction information, or guidance information to the destination desired by the manipulator. As shown in FIG. 1, the navigation apparatus 50 includes a liquid crystal display 51 as a display unit. The liquid crystal display 51 is disposed at a position where the manipulator can visually recognize the display screen 52, for example, at the center in the vehicle width direction of the instrument panel 11 of the vehicle 10.

As shown in FIG. 1, the navigation apparatus 50 is formed to be separate from the input apparatus 100 and is arranged at a position away from the input apparatus 100. The navigation apparatus 50 is connected to the input apparatus 100 via CAN communication using, for example, a Controller Area Network bus (CAN bus (registered trademark)). The navigation apparatus 50 may also be referred to as a predetermined apparatus.

Figure 2:
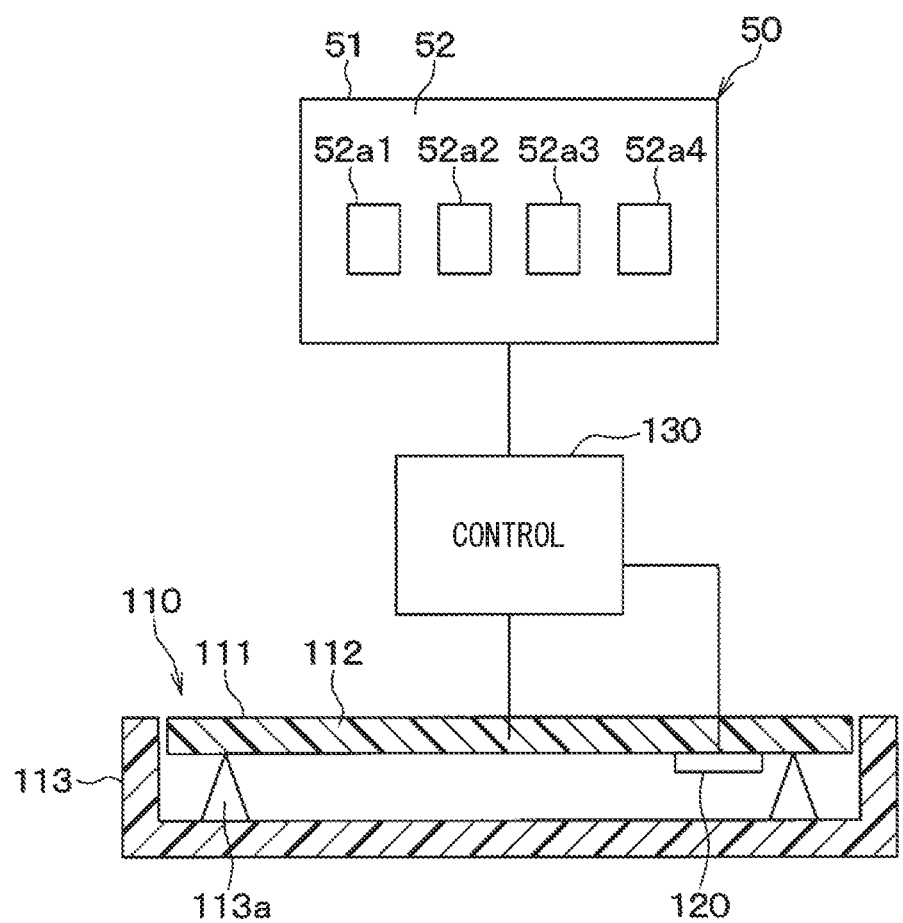
FIG. 2 is a block diagram showing an input apparatus.

On the display screen 52 of the liquid crystal display 51, the position of the vehicle on the map is displayed, and various manipulation buttons 52a1 to 52a4 for manipulating the navigation apparatus 50 are displayed as shown in FIG. 2. The various manipulation buttons 52a1 to 52a4 are buttons (which may be so-called manipulation icons) used for enlarged map display, reduced display, and destination guidance setting, for example. Hereinafter, in order to distinguish the various manipulation buttons 52a1 to 52a4, they are referred to as a first manipulation button 52a1, a second manipulation button 52a2, a third manipulation button 52a3, and a fourth manipulation button 52a4.

Note that any one of the manipulation buttons 52a1 to 52a4 may be selected as a selection position on the display screen 52 and the change in the selection position is associated with the change in the coordinate position of the finger F on the manipulation surface 111 in the input apparatus 100 described later. Details of this will be described later.

(Configuration of Input Apparatus)

As shown in FIG. 1, the input apparatus 100 is disposed at a position adjacent to an armrest 13, for example, in a center console 12 of the vehicle 10, and within an easy reach of the manipulator. As shown in FIG. 2, the input apparatus 100 includes a manipulation device 110, a driver 120, and a controller 130.

The manipulation device 110 forms a so-called touch pad, and is a part that performs an input manipulation on the navigation apparatus 50 with a manipulating body such as a finger F of a manipulator. The manipulation device 110 includes a manipulation surface 111, a touch sensor 112, and a housing 113.

The manipulation surface 111 is, for example, a flat portion that is exposed to the manipulator side at a position adjacent to the armrest 13 and is operated by the manipulator; the entire surface is made of a material that improves finger sliding. The manipulation surface 111 is provided to allow input to the navigation apparatus 50 through the finger manipulation by the manipulator, for example, a predetermined manipulation such as selection or push determination on the various manipulation buttons 52a1 to 52a4 displayed on the display screen 52.

As shown in FIG. 2, the touch sensor 112 is, for example, a capacitive detector provided on the back side of the manipulation surface 111. The touch sensor 112 has a rectangular flat plate shape, for example, and detects a manipulation state of the manipulation surface 111 by the finger F of the manipulator.

The touch sensor 112 has, for example, a configuration in which electrodes extending along the x-axis direction and electrodes extending along the y-axis direction are arranged in a grid pattern on the manipulation surface 111; the touch sensor 112 is connected to the controller 130, which will be described later, as shown in FIG. 2. Each electrode changes the generated capacitance according to the position of the finger F of the manipulator close to the surface of the touch sensor 112, and outputs the generated capacitance signal to the controller 130 as a sensitivity value. The surface of the touch sensor 112 is covered with an insulating sheet made of an insulating material. The touch sensor 112 is not limited to the capacitance type, and various types such as other pressure sensitive types can be used.

As shown in FIG. 2, the housing 113 is a member that supports the manipulation surface 111 and the touch sensor 112 while containing them, and a plurality of support portions 113a are formed on the bottom surface portion thereof. The support portions 113a support the manipulation surface 111 and the touch sensor 112 so as to be vibrated by the driver 120 described later. For example, the housing 113 has a flat outer surface and is disposed in a recess (not shown) provided in the center console 12.

The driver 120 is a member that generates ultrasonic vibration in a direction orthogonal to the manipulation surface 111, and is provided at a predetermined position on the back surface side of the touch sensor 112, for example, as illustrated in FIG. 2. The driver 120 is joined to the touch sensor 112 by a predetermined method such as an adhesive, a double-sided tape, a screw member, or soldering. The driver 120 is connected to the controller 130, which will be described later, the generation of vibration is controlled by the controller 130. In addition, as wiring, in order to reduce the vibration stress by ultrasonic vibration, flexible wiring can be used, for example.

The driver 120 uses an ultrasonic transducer, for instance. The ultrasonic transducer is made of a material having a piezo effect, such as piezoelectric ceramics, which changes its volume when a voltage is applied, and generates a voltage when it receives a force from the outside. The driver 120 has an electrode; when an AC voltage is applied to the electrode, the driver 120 vibrates due to the piezoelectric effect. The vibration frequency of the driver 120 correlates with the frequency of the applied AC voltage, and can be changed as appropriate.

The controller 130 performs a drive control of the driver 120 based on a signal obtained from the touch sensor 112, and includes a CPU, a RAM, a storage medium, and the like. Specifically, from the signal obtained from the touch sensor 112, the controller 130 acquires the manipulation state of the finger F of the manipulator such as a manipulation position (i.e., coordinate position) of the finger F of the manipulator on the manipulation surface 111, the movement direction of the finger F, and the movement distance of the finger F. Further, the controller 130 acquires, as the manipulation state of the finger F, the presence/absence of a pressing manipulation on any one of the manipulation buttons on the manipulation surface 111. Then, according to the above manipulation states, the controller 130 is configured to control the generation state of the vibration by the driver 120, generate a predetermined vibration on the manipulation surface 111, and perform the pulling-in control for the finger F.

In addition, "pulling-in control" here refers to a drive control for the driver 120 performed by the controller 130 in order to remind the manipulator of the feeling of pulling-in with respect to the finger F when the manipulator performs a predetermined manipulation on the manipulation surface 111 with the finger F. Details of this will be described later.

The above is the basic configuration of the input apparatus 100 of the present embodiment.

(Operation of Input Apparatus)

Next, the operation and effect of the input apparatus 100 of the present embodiment will be described with reference to FIGS. 3A, 3B, and 4.

Figure 3A:
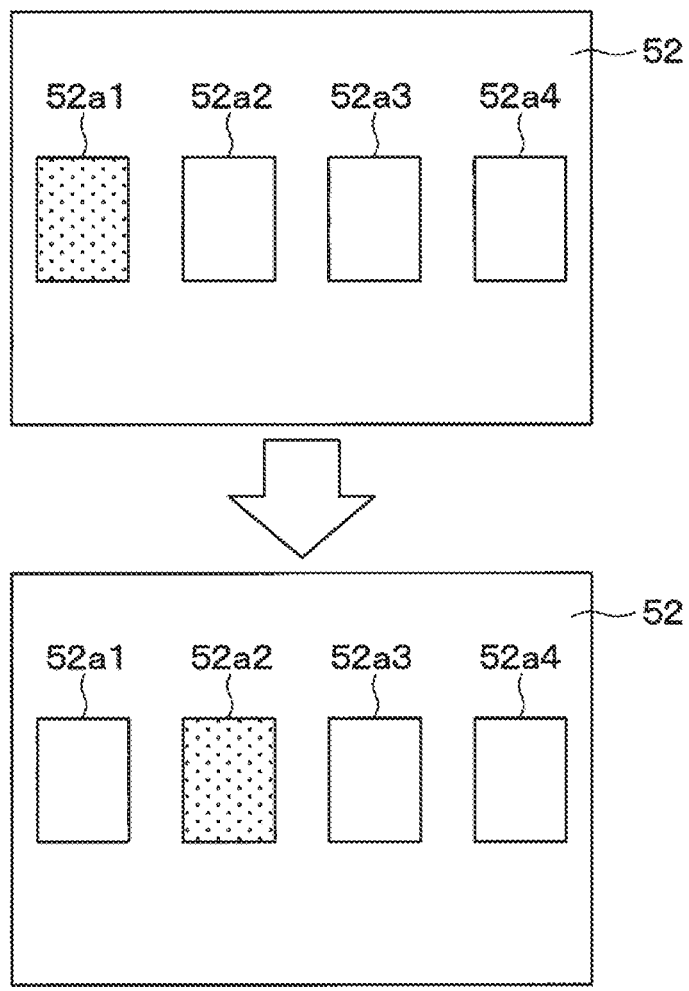
FIG. 3A is an explanatory diagram showing an example of changing the selection state of the manipulation buttons on a display screen according to a first embodiment.
Figure 3B:
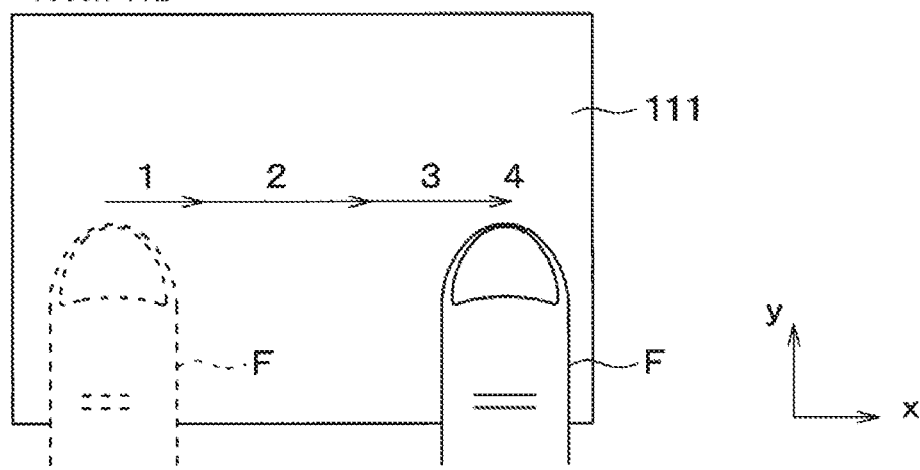
FIG. 3B is an explanatory diagram showing a movement state of a finger on the touch pad corresponding to FIG. 3A.

The following will describe, as a representative example, the case where the finger manipulation of the manipulator changes from the state where the first manipulation button 52a1 is selected to the state where the second manipulation button 52a2 is selected, as shown in FIGS. 3A and 3B.

In this case, the finger manipulation on the manipulation surface 111 is divided into four manipulations "1" to "4" as shown in FIG. 3B, for example.

Hereinafter, for the sake of simplicity and convenience, the manipulations corresponding to "1" to "4" in FIG. 3B are referred to as "manipulation 1", "manipulation 2", "manipulation 3", and "manipulation 4", respectively.

The manipulation 1 corresponds to an initial movement in which the finger F is placed at a predetermined position on the manipulation surface 111 and then starts to move toward a target area. The manipulation 2 corresponds to a movement of moving toward a target area at a predetermined speed after the manipulation 1. The manipulation 3 corresponds to a movement of bringing the finger F close to the target area while decelerating after the manipulation 2. The manipulation 4 corresponds to a state in which the finger F is completely stopped at a predetermined target position on the manipulation surface 111 after the manipulation 3. Note that the lengths of the arrows of the manipulations "1" to "3" correspond to the moving distances of the finger F in the respective manipulations "1" to "3". When the manipulator performs these manipulations 1 to 4, the controller 130 executes the control shown in FIG. 4.

First, in S100, the controller 130 acquires a touch position, that is, a coordinate position, of the finger F with respect to the manipulation surface 111 based on a signal output from the touch sensor 112. Further, when the finger F touches the position corresponding to the first manipulation button 52a1 on the manipulation surface 111, the controller 130 performs control to highlight the width of the outer peripheral frame of the first manipulation button 52a1 on the display screen 52, the color of the manipulation button itself, and the like.

Next, in S110, the controller 130 determines whether or not the movement integrated value of the finger F has exceeded a preset movement determination threshold value in order to determine whether or not the finger F has moved. In S110, when it is determined that the integrated movement value has exceeded the movement determination threshold value (i.e., when an affirmative determination is made), the controller 130 proceeds to S120, assuming that the movement of the finger F for manipulation has occurred. On the other hand, when a negative determination is made in S110, the controller 130 returns to S100.

This "integrated movement value" may employ the change amount of the touch coordinate of the finger F acquired in S100. For example, an initial coordinate is defined as an initial touch coordinate at the time when the contact or touch with the manipulation surface 111 by the finger F is detected. The integrated movement amount may be a change amount of the touch coordinate from the initial coordinate to the touch coordinate after a predetermined elapsed time from the time when the initial coordinate is acquired. The "movement determination threshold value" is a predetermined threshold value used for determining whether or not the manipulator has moved the finger F on the manipulation surface 111.

In S120, the controller 130 performs a display button transition process corresponding to "manipulation 1" in FIG. 3B. That is, as shown in FIG. 3A, the controller 130 changes the display of the selection state for the manipulation button from the state in which the first manipulation button 52a1 is emphasized to the state in which the second manipulation button 52a2 in the direction corresponding to the movement direction of the finger F is emphasized.

Next, in S130, the controller 130 performs vibration generation processing corresponding to "manipulation 2" in FIG. 3B. Here, the controller 130 generates a predetermined vibration, for example, an ultrasonic vibration, on the manipulation surface 111 by actuating the driver 120 for a predetermined time t1.

Specifically, when the driver 120 is actuated by the controller 130, an air layer is formed between the manipulation surface 111 and the finger F due to ultrasonic vibration, and the manipulation surface 111 and the finger F are separated to thereby reduce the frictional force. Therefore, the finger F is provided with a feeling of pulling-in as if the finger F is pulled in toward the second manipulation button 52a2. In other words, the controller 130 actuates the driver 120 to perform a control for setting a low friction state between the manipulation surface 111 and the finger F for a predetermined time t1. The predetermined time t1 is set in advance as a time for obtaining a reliable feeling of pulling-in. When the predetermined time t1 has elapsed, the controller 130 proceeds to S140.

In S140, the controller 130 performs a process of releasing the low friction vibration, that is, a process of stopping the drive of the driver 120, corresponding to the "manipulation 3" in FIG. 3B. That is, the controller 130 returns the friction state between the manipulation surface 111 and the finger F from the low friction state to the original high friction state, and sets the waiting state for a predetermined time t2. The predetermined time t2 is set in advance as a time until the finger F stops stably. Then, the controller 130 changes the coordinate position corresponding to "manipulation 4" in FIG. 3B. That is, the controller 130 determines the change of the coordinate position of the finger F on the manipulation surface 111 from the position corresponding to the first manipulation button 52a1 to the position corresponding to the second manipulation button 52a2, for example, the center position of the second manipulation button 52a2.

In S150, the integrated movement value of the finger F calculated in S110 is reset. The controller 130 returns to S100.

As described above, in the present embodiment, the controller 130 generates a predetermined vibration, for example, an ultrasonic vibration, for instance, a pulling-in control, for a predetermined time t1 at the timing when the finger F moves regardless of the position of the finger F on the manipulation surface 111. Therefore, since the manipulator can feel the feeling of pulling-in according to the movement of the finger F, the input apparatus can provide a stable manipulation feeling to the manipulator without giving a sense of incongruity.

Moreover, a known input apparatus performs vibration control corresponding to the position of the finger on the manipulation surface. In such an input apparatus, if the position of the stopped finger is within the target and close to the peripheral area, the slight movement of the finger may cause an unstable state in which vibration occurs or stops.

However, in the present embodiment, the controller 130 performs the pulling-in control according to the timing at which the finger F moves, instead of the position of the finger F on the manipulation surface 111; thereby, the unstable state as described above can be suppressed.

Further, the controller 130 stops the generation of the ultrasonic vibration after the lapse of the predetermined time t1, enters the wait state for the predetermined time t2, and then changes the coordinate position of the finger F on the manipulation surface 111. Therefore, it is possible to prevent the finger F from passing through the area corresponding to the target manipulation button (i.e., the area corresponding to the second manipulation button 52a2, on the manipulation surface 111).

The above control is not limited to the example of FIGS. 3A and 3B, and can be applied to the case where the selected state of a one of the manipulation buttons 52a1 to 52a4, is changed to the selected state of a different one of the manipulation buttons 52a1 to 52a4 selected by the finger manipulation on the manipulation surface 111 of the manipulator.

Further, the above-mentioned "low friction state" and "high friction state" are just relative. That is, the "low friction state" means a state in which the driver 120 is driven and the frictional force between the manipulation surface 111 and the finger F is lower than the state in which the driver 120 is not driven. The "high friction state" means a state where the driver 120 is not driven.

Modification Example of First Embodiment

Figure 4:
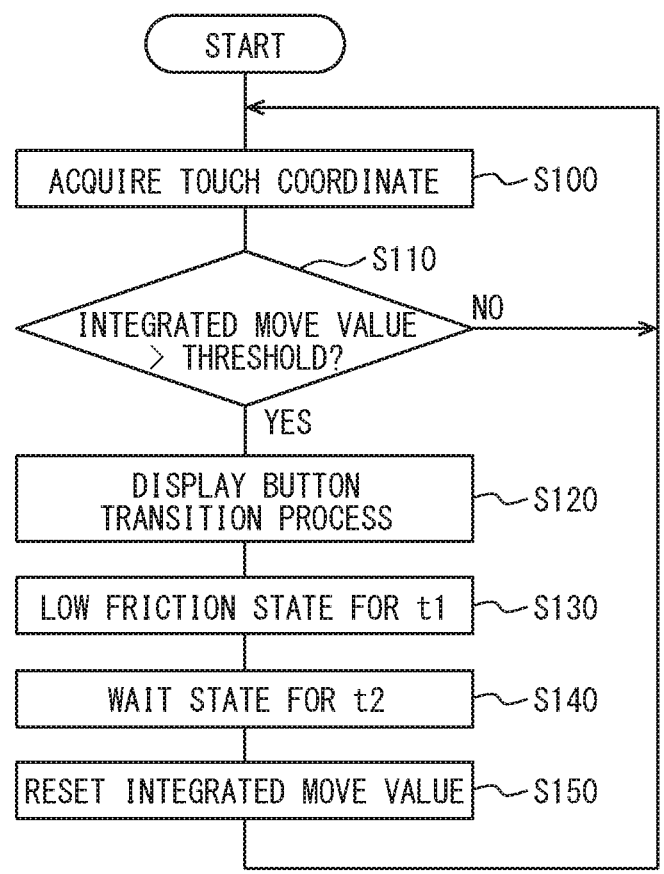
FIG. 4 is a flowchart showing a control in the first embodiment.

S120 in FIG. 4 may be provided between S110 and S150.

In addition, after a predetermined time t1, the controller 130 may generate a vibration different from the predetermined vibration (vibration different from the ultrasonic vibration) for giving the click feeling to the finger F by the driver 120. As a result, the manipulator can clearly recognize that the finger F has been pulled into a different one of the manipulation buttons from any one of the manipulation buttons 52a1 to 52a4 by the click feeling.

In addition, after the predetermined time t1, the controller 130 may determine the coordinate position of the finger F on the manipulation surface 111 corresponding to the different manipulation button 52a2 after the movement according to the pressing force of the finger F on the manipulation surface 111. For example, when the pressing force becomes a fixed value or less, or when the change in the pressing force becomes a fixed value or more, a new coordinate position is determined. Specifically, the force in the direction orthogonal to the manipulation surface 111 (i.e., the pressing force) is calculated from the capacitance signal obtained from the touch sensor 112; the coordinate of the finger F after movement may be determined based on the amount of change in the force. The amount of change in the pressing force is large when the finger F is moved, whereas the amount of change is small when the finger F is stationary on the manipulation surface 111. That is, when the change amount of the pressing force by the finger F (i.e., the change amount of the load) is equal to or less than a predetermined value, the finger F is determined to be stationary on the manipulation surface 111 and the coordinate of the finger F after movement may be determined. As a result, a more accurate coordinate position can be determined.

Figure 5A:
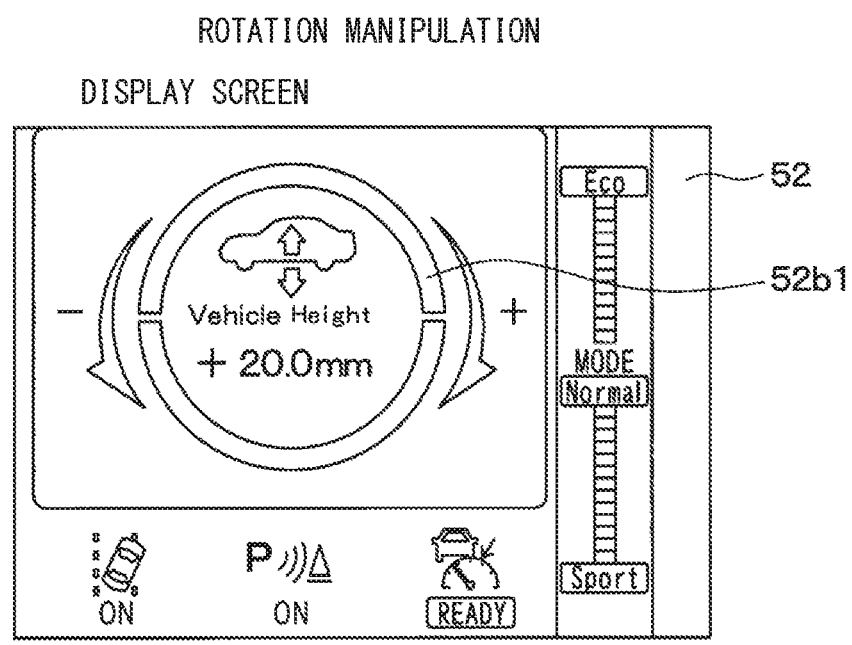
FIG. 5A is an explanatory diagram showing an example of a display screen in a rotation manipulation according to a modification example of the first embodiment.
Figure 5B:
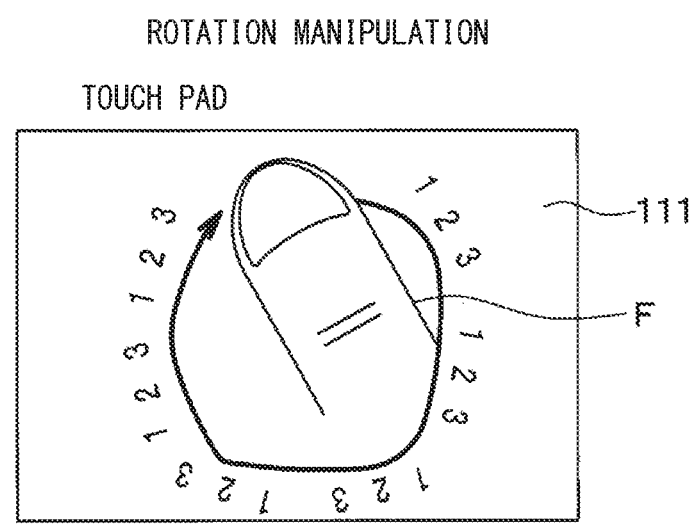
FIG. 5B is an explanatory diagram showing a finger movement state on the touchpad corresponding to FIG. 5A.
Figure 6A:
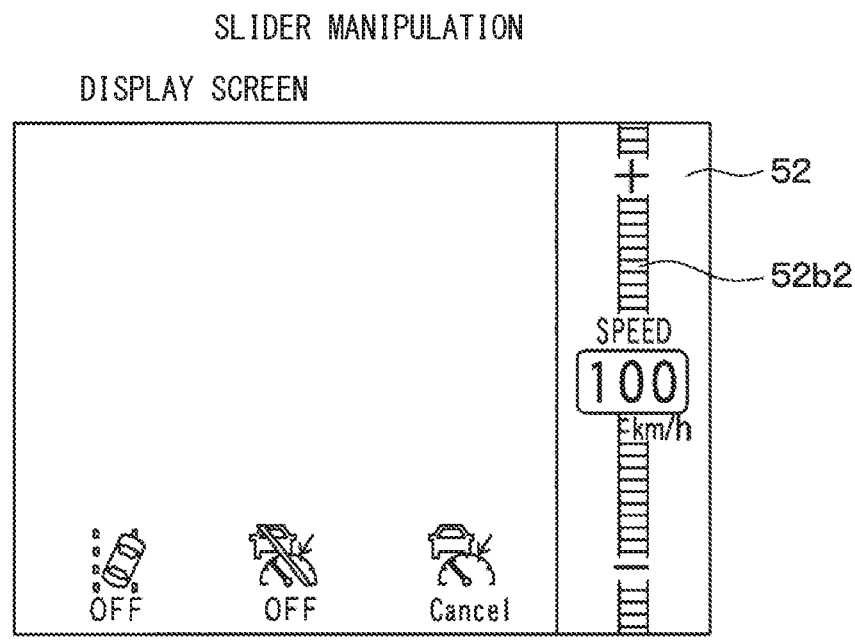
FIG. 6A is an explanatory diagram showing an example of a display screen in a slider manipulation according to a modification example of the first embodiment.
Figure 6B:
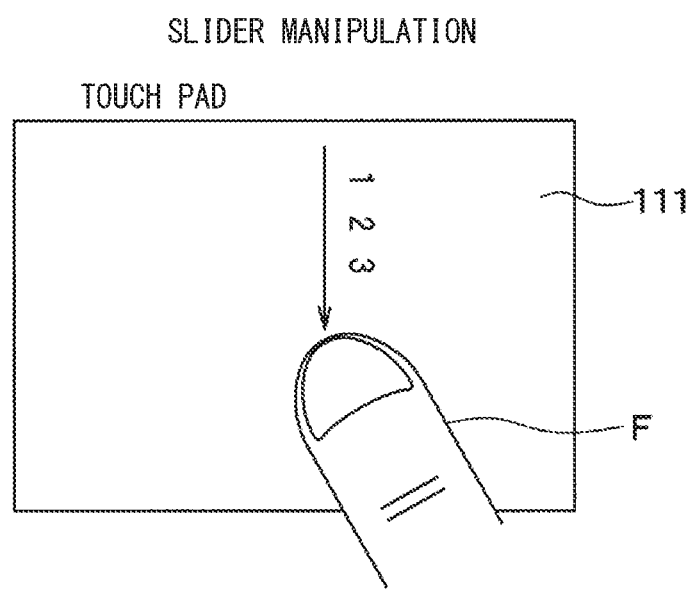
FIG. 6B is an explanatory diagram showing a movement state of a finger on the touch pad corresponding to FIG. 6A.

The input apparatus of the first embodiment may also be applied to a case where a rotation manipulation is performed on a manipulation switch 52b1 (i.e., a vehicle height adjustment switch) on the display screen 52, as shown in FIGS. 5A and 5B, for example. Furthermore, the input apparatus of the first embodiment can also be applied to a case where a slider manipulation is performed on a manipulation switch 52b2 (i.e., a vehicle speed adjustment switch) on the display screen 52, as shown in FIGS. 6A and 6B, for example.

Specifically, when a rotation manipulation or a slider manipulation is performed, the controller 130 performs processing corresponding to "manipulation 1", "manipulation 2", and "manipulation 3" in FIG. 3B, that is, S120, S130, and S140 in FIG. 4 are repeated. Thereby, for example, when performing control to adjust the vehicle height, the vehicle speed, or the like to a predetermined amount, the manipulator can obtain an accurate tactile sense and can perform stable adjustment.

Second Embodiment

An input apparatus according to a second embodiment will be described with reference to FIGS. 7A to 12B. The input apparatus of the second embodiment has the same configuration as that of the first embodiment, but differs from the first embodiment in the control in the controller 130. This different point will be mainly described in the present embodiment.

In the second embodiment, the controller 130 sets predetermined times t1 and t2 and a movement determination threshold value for the finger F according to the moving speed of the finger F.

Here, on the display screen 52, for example, as shown in FIG. 7A, in addition to various manipulation buttons 52a1 to 52a4, a fifth manipulation button 52a5, a sixth manipulation button 52a6, a seventh manipulation button 52a7, and the like are provided. Assume that these manipulation buttons are displayed in a row. In the finger manipulation on the manipulation surface 111 in such a situation, the following may occur.

For example, when the manipulator moves the finger F relatively slowly, the distance between the neighboring manipulation buttons 52a1 to 52a7 is short as shown in FIG. 7B. As a result, as shown in FIG. 7A, the entire manipulation buttons can be moved as a whole.

Figure 8A:
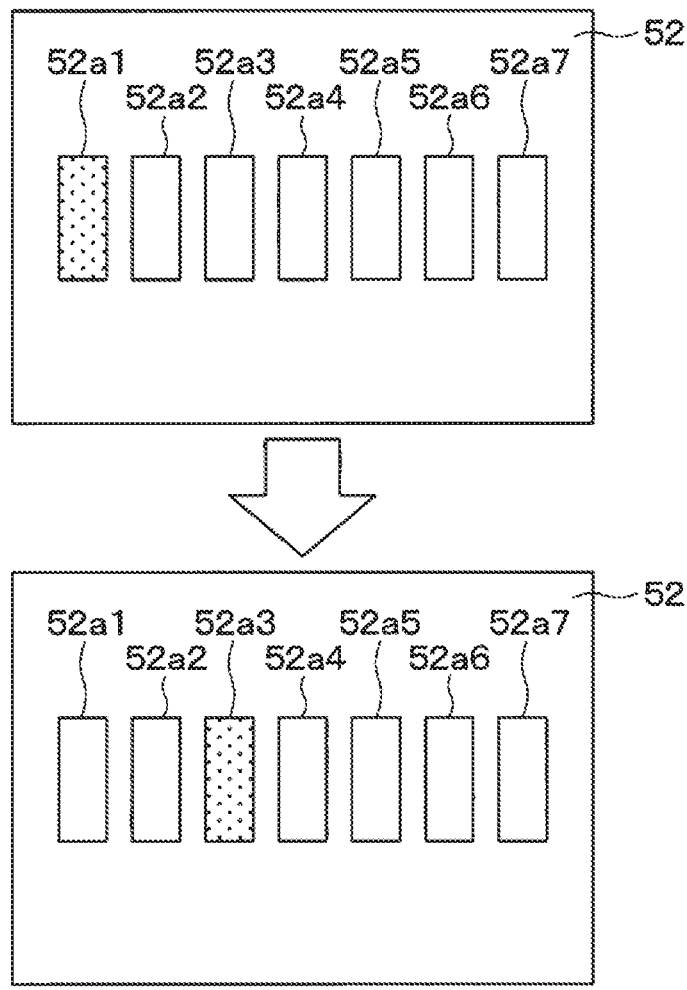
FIG. 8A is an explanatory diagram showing an example of changing the selection state of the manipulation buttons on the display screen by moving a finger quickly.
Figure 8B:
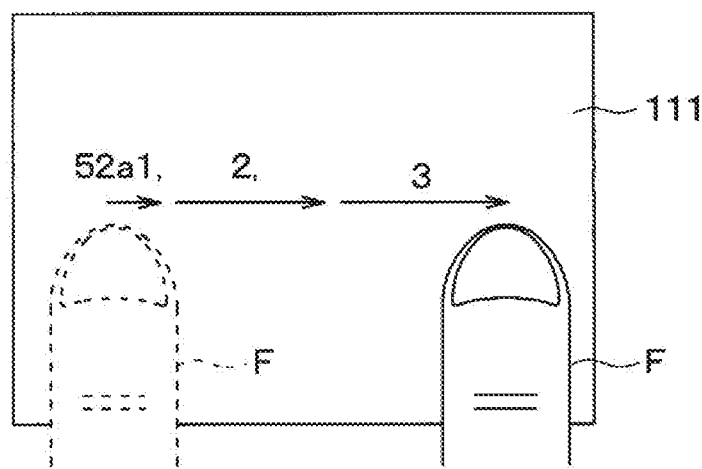
FIG. 8B is an explanatory diagram showing a movement state of a finger on the touch pad corresponding to FIG. 8A.

On the other hand, when the manipulator moves the finger F relatively fast, as shown in FIG. 8B, even if the movement distance is the same as when the manipulator moves the finger F relatively slowly as a whole, the finger F reaches the other end of the manipulation surface 111 in a short time. As a result, as shown in FIG. 8A, the number of manipulation buttons over which the finger F can move is reduced.

The situation described above can occur in the same way in the rotation manipulation or slider manipulation described with reference to FIGS. 5A, 5B, 6A, and 6B. That is, when the finger manipulation is performed quickly, the number of manipulation buttons and the manipulation amount which can be manipulated with the same movement amount are decreased in inverse proportion to the moving speed of the finger. This does not agree with the sense of the manipulator.

Therefore, in the present embodiment, the controller 130 determines the predetermined time t1 according to the moving speed of the finger F. Note that the predetermined time t2 and the movement determination threshold value for determining whether or not the finger F has moved may also be determined according to the moving speed of the finger F.

Figure 9:
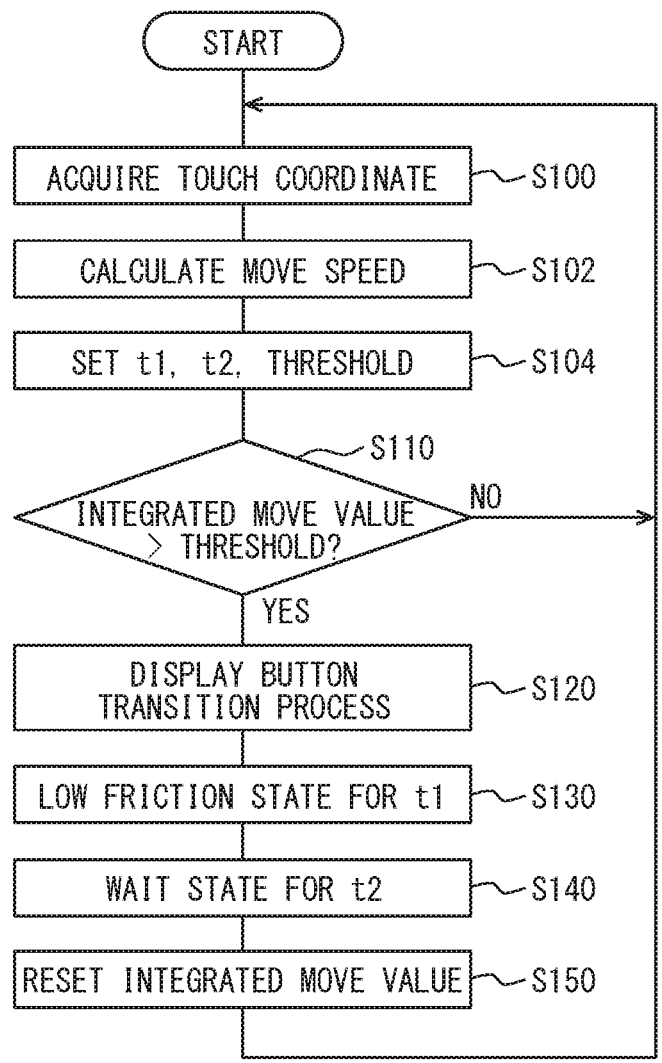
FIG. 9 is a flowchart showing a control according to a second embodiment.

As shown in FIG. 9, the flowchart of the pulling-in control performed by the controller 130 further includes S102 and S104 between S100 and S110 with respect to the flowchart of the first embodiment described in FIG. 4.

As shown in FIG. 9, after acquiring the touch position of the finger F on the manipulation surface 111 in S100, the controller 130 proceeds to S102 and calculates the moving speed of the finger F. The controller 130 calculates the moving speed by dividing the movement amount of the finger F by the movement time before the finger F reaches the movement determination threshold value.

Figure 10A:
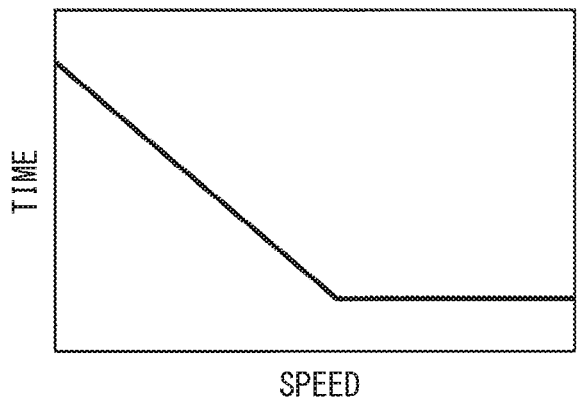
FIG. 10A is a graph showing a first example of a relationship of a predetermined time with respect to a finger moving speed in the second embodiment.
Figure 10B:
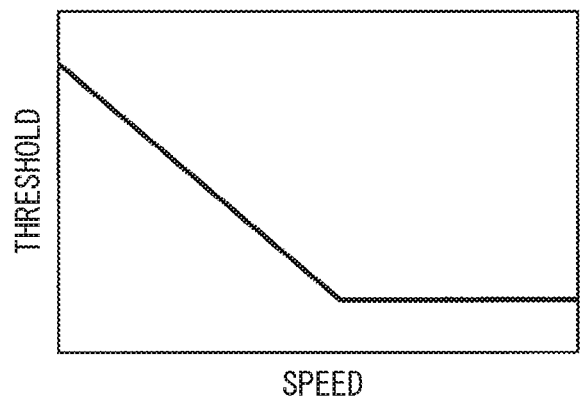
FIG. 10B is a graph showing a setting example of a movement determination threshold value corresponding to FIG. 10A.
Figure 11A:
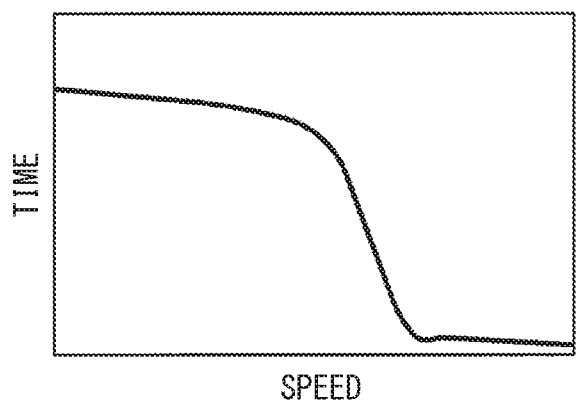
FIG. 11A is a graph showing a second example of a relationship between a finger moving speed and a predetermined time according to the second embodiment.
Figure 11B:
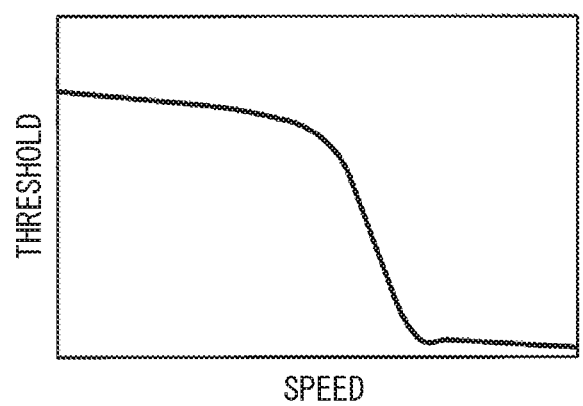
FIG. 11B is a graph showing a setting example of a movement determination threshold value corresponding to FIG. 11A.
Figure 12A:
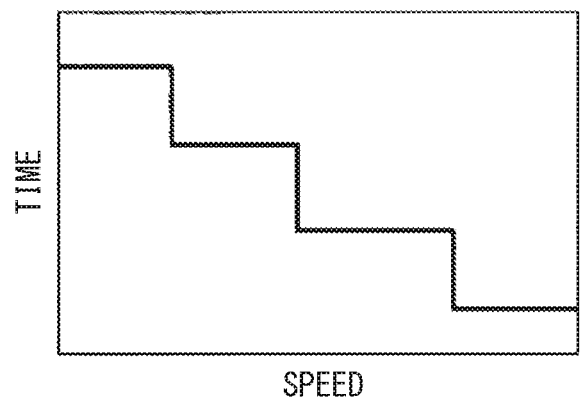
FIG. 12A is a graph showing a third example of the relationship between a finger moving speed and a predetermined time according to the second embodiment.
Figure 12B:
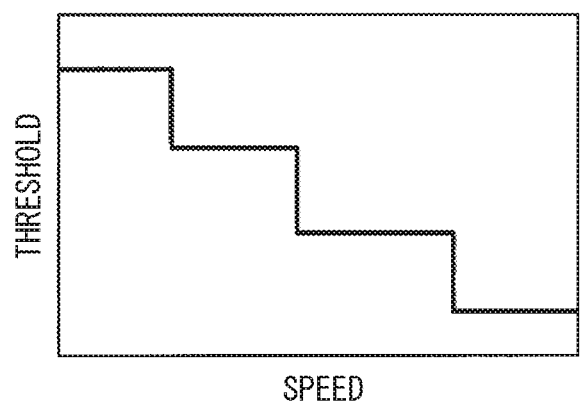
FIG. 12B is a graph showing a setting example of a movement determination threshold value corresponding to FIG. 12A.

Subsequently, in S104, the controller 130 sets a predetermined time t1, a predetermined time t2, and a movement determination threshold value from a map stored in advance. For example, as shown in FIG. 10A or FIG. 10B, as the moving speed of the finger F increases to a predetermined value, the predetermined times t1 and t2 and the movement determination threshold value decrease linearly in inverse proportion. When the moving speed of the finger F is equal to or higher than a predetermined value, these values are constant.

Then, the controller 130 executes S110 to S150 after S104.

As a result, the moving speed of the finger F and the set predetermined time t1 are inversely proportional to each other, and the predetermined time t1 is set relatively short as the moving speed increases. Further, if necessary, the predetermined time t2 and the movement determination threshold value are set in the same manner as the predetermined time t1. This achieves the input apparatus in which when the finger F moves on the manipulation surface 111, the number of manipulation buttons 52a1 to 52a7 within the same movement range is not changed even when the moving speed of the finger F is different.

In addition to this, the maps for setting the predetermined times t1 and t2 and the movement determination threshold value may be as shown in FIGS. 11A, 11B, 12A, and 12B, for example. The maps shown in FIGS. 11A and 11B can be used, for example, when setting predetermined times t1 and t2 and a movement determination threshold value in accordance with the non-linear characteristics of humans. Further, the maps of FIGS. 12A and 12B can be used, for example, when the predetermined times t1 and t2 and the movement determination threshold value are changed in steps with respect to the moving speed of the finger F. When the predetermined times t1 and t2 and the movement determination threshold value are changed in steps, it is possible for the manipulator to easily understand the difference in control action and to reduce the calculation processing load by the controller 130.

First Modification Example of Second Embodiment

Figure 13A:
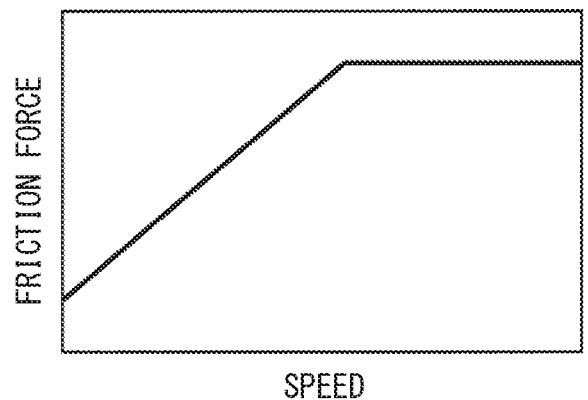
FIG. 13A is a graph showing a first example of a relationship between a frictional force and a finger moving speed according to a modification example of the second embodiment.
Figure 13B:
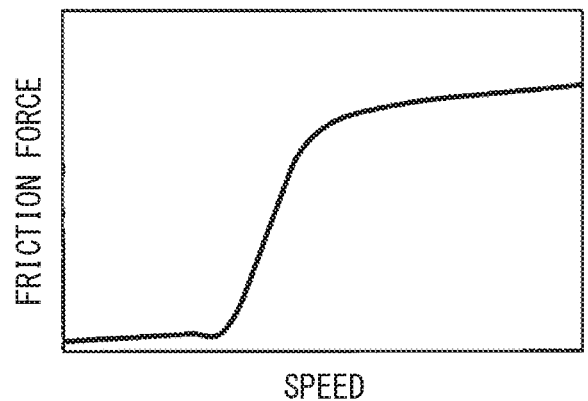
FIG. 13B is a graph showing a second example of the relationship between a frictional force and a finger moving speed.
Figure 13C:
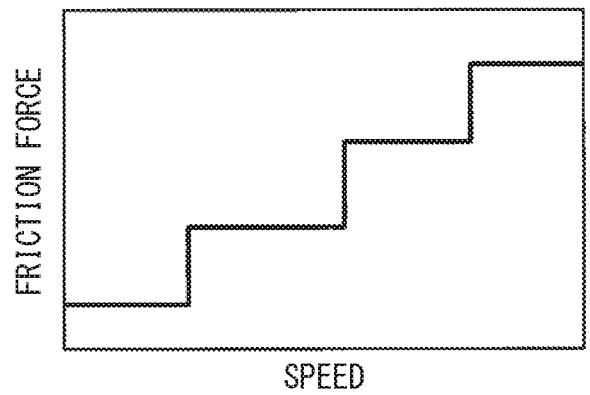
FIG. 13C is a graph showing a third example of the relationship between a frictional force and a finger moving speed.

In contrast to the second embodiment, instead of a map for setting the predetermined time t1, as shown in FIGS. 13A to 13C, a map that changes the frictional force generated between the manipulation surface 111 and the finger F with respect to the moving speed of the finger F may be used. In an example of the map of FIG. 13A, the frictional force increases linearly as the moving speed of the finger F increases to a predetermined value. When the moving speed of the finger F exceeds a predetermined value, the frictional force becomes constant.

In addition, as a method of changing the frictional force by the squeeze effect accompanying the ultrasonic vibration, for example, adjusting the amplitude can be mentioned. Specifically, by adjusting the amplitude of the ultrasonic vibration to be small, the frictional force can be made larger than before the adjustment. In contrast, by adjusting the amplitude to be large, the frictional force can be made smaller than before the adjustment.

In setting the map related to the frictional force, a non-linear one as shown in FIG. 13B or a step-like one as shown in FIG. 13C can be applied.

Second Modification Example of Second Embodiment

In contrast to the second embodiment, the controller 130 may perform control to change the sizes of the various manipulation buttons 52a1 to 52a7 in accordance with the moving speed of the finger F. In this case, for example, the controller 130 sets the sizes of the various manipulation buttons 52a1 to 52a7 relatively small as the moving speed of the finger F increases. Thereby, the manipulator can visually recognize whether the moving speed of the finger F is high or low.

Third Embodiment

An input apparatus according to a third embodiment will be described with reference to FIGS. 14 to 16.

The input apparatus of the present embodiment is different from the first embodiment in that the low friction state due to the vibration of the driver 120 in the first embodiment is set as a first low friction state, and a second low friction state is generated by the controller 130 driving the driver 120 when the touch position of the finger F is first detected. This different point will be mainly described in the present embodiment.

In the present embodiment, the controller 130 performs two controls of the first low friction state (which may also be referred to as a first lowest friction state) and the second low friction state (which may also be referred to as a second lowest friction state) between the finger F and the manipulation surface 111.

Specifically, the first low friction state is a vibration state of the manipulation surface 111 for causing the manipulators finger F to feel a feeling of pulling-in. In addition to the first low friction state, the controller 130 first brings the manipulation surface 111 into the second low friction state by driving the driver 120 at least (i.e., at the latest) when the touch position of the finger F on the manipulation surface 111 is first detected in order to make it easier to thereafter stop the finger F in a high friction state after the first low friction state.

Here, "detecting the touch position first" means detecting the touch position at the time when the manipulating body of the manipulator contacts the manipulation surface 111 for the first time within a time period from when the manipulating body of the manipulator contacts the manipulation surface 111 to when the manipulating body separates from the manipulation surface 111. Suppose a case where the manipulator performs a plurality of movements, each movement being from when contacting the manipulation surface 111 to when separating from the manipulation surface 111. In each movement, the detection of the touch position at the time of first contact with the manipulation surface 111 means "detecting the touch position first".

Now, for example, the following will describe a representative example where due to the finger manipulation shown in FIG. 3B, the selection state is changed from the first manipulation button 52a1 to the second manipulation button 52a2 on the display screen 52, as shown in FIG. 3A.

First, the frictional force change between the manipulators finger F and the manipulation surface 111 when the manipulations of FIGS. 3A and 3B are performed with the input apparatus of the first embodiment will be described with reference to FIG. 14.

Figure 14:
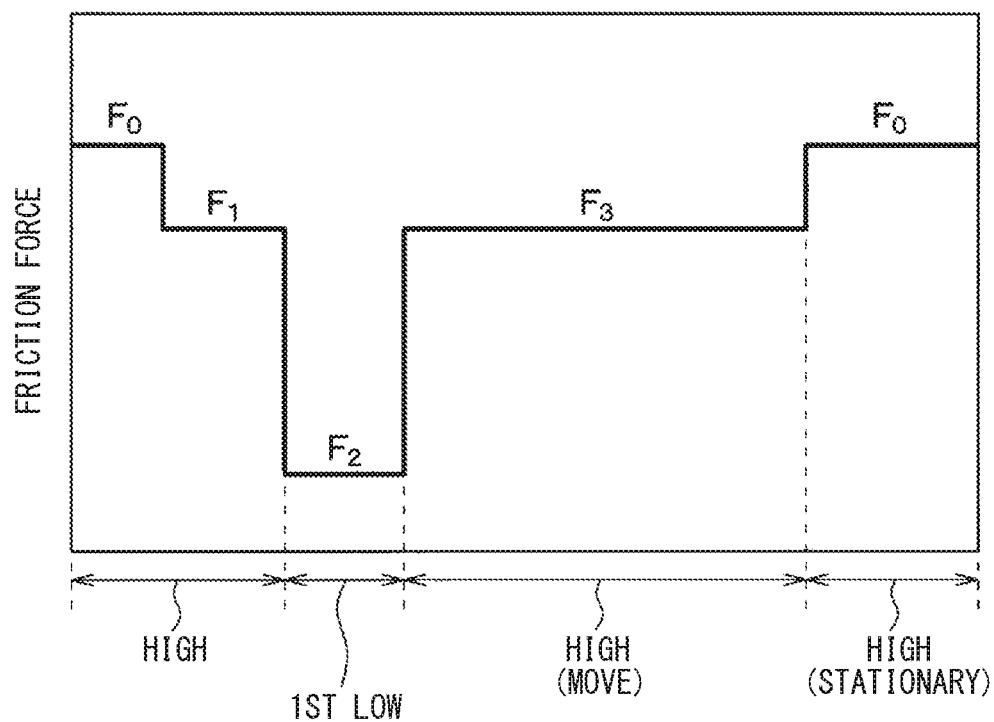
FIG. 14 is a graph showing an example of a change in frictional force on the manipulation surface according to the first embodiment.

In the first embodiment, as shown in FIG. 14, immediately after the manipulator touches the manipulation surface 111 with the finger F, the controller 130 does not drive the driver 120; thus, a high friction state (which may also be referred to as a non-vibration state) exists between the manipulator's finger F and the manipulation surface 111. This high friction state corresponds to the state of the manipulation surface 111 in the manipulation 1 shown in FIG. 3B. The high friction state can be divided into (i) a stationary state before the finger F moves and (ii) a moving state where the finger F is moving. The frictional force in the high friction state is the stationary frictional force F0 in the stationary state and the moving frictional force F1 in the moving state.

Thereafter, in the manipulation 2 shown in FIG. 3B, since the controller 130 drives the driver 120 for a predetermined time t1 to place the manipulation surface 111 in the first low friction state of which the frictional force is a moving frictional force F2 that is lower than the moving frictional force F1.

Subsequently, in the manipulation 3 shown in FIG. 3B, the controller 130 stops the driver 120 for a predetermined time t2 and returns the manipulation surface 111 to the high friction state of which the frictional force is a moving frictional force F3 higher than the moving frictional force F2 in the first low friction state. The moving frictional force F3 is basically the same magnitude as the moving frictional force F1.

Then the manipulation 4 shown in FIG. 3B returns the present state to the same state as the first stationary state in manipulation 1 of which the frictional force becomes the stationary frictional force F0.

Here, when the manipulation surface 111 shifts from the first low friction state to the high friction state, there is a concern that the finger F is less likely to stop in the area intended by the manipulator. Specifically, as shown in FIG. 14, the frictional force between the finger F and the manipulation surface 111 is the frictional force in the state where the driver 120 is not driven and the finger F is stationary (that is, the stationary frictional force F0 being the highest). Then, when the manipulator moves the finger F with a force larger than the stationary frictional force F0, the finger F moves on the manipulation surface 111. Thereafter, the manipulation surface 111 is shifted by the controller 130 in the order of the first low friction state and the high friction state. When the manipulation surface 111 shifts from the first low friction state to the high friction state, the finger F starts to move with a force larger than the initial stationary frictional force F0. Even when the frictional force returns from F2 to F3, the finger F may be less likely to stop because F3 is smaller than F0.

On the other hand, the input apparatus of the present embodiment makes it easier to stop the finger F in the high friction state after the manipulation surface 111 is in the first low friction state. To achieve this, when the finger F first contacts the manipulation surface 111, the controller 130 performs control to shift the manipulation surface 111 to a second low friction state.

Figure 15:
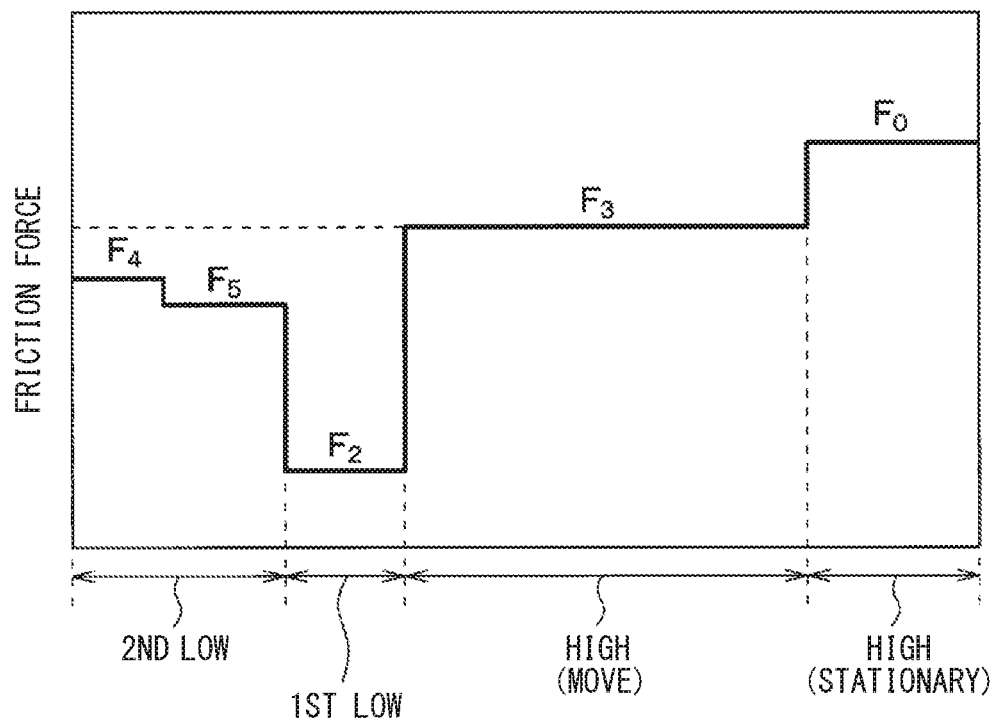
FIG. 15 is a graph showing an example of a change in frictional force on the manipulation surface according to a third embodiment.

Specifically, as shown in FIG. 15, before the first low friction state for recalling a feeling of pulling-in, the controller 130 drives the driver 120 to perform a control to bring the manipulation surface 111 into the second low friction state. The second low friction state is a state in which the controller 130 drives the driver 120 with an amplitude smaller than the amplitude in the first low friction state, for example. This second low friction state corresponds to the state of the manipulation surface 111 in the manipulation 1 in FIG. 3B.

At this time, the controller 130 drives the driver 120 so that the stationary frictional force F4 in the second low friction state is at least smaller than the moving frictional force F3. That is, the frictional force in the second low friction state is (i) the frictional force F4 in the stationary state that is smaller than the moving frictional force F3 in the stationary state, and (ii) the frictional force F5 in the moving state that is smaller than the frictional force F4 and larger than the frictional force F2 in the first low friction state in the moving state.

Thus, when the manipulator moves the finger F after first placing the finger F on the manipulation surface 111, the manipulator moves the finger F with a force larger than the stationary frictional force F4 at least. Further, in the high friction state, the moving frictional force F3 is larger than the stationary frictional force F4; thus, the finger F is more likely to stop in the moving frictional force F3 than in the second low friction state. The manipulator can thus stop the finger F more easily in the target area.

Figure 16:
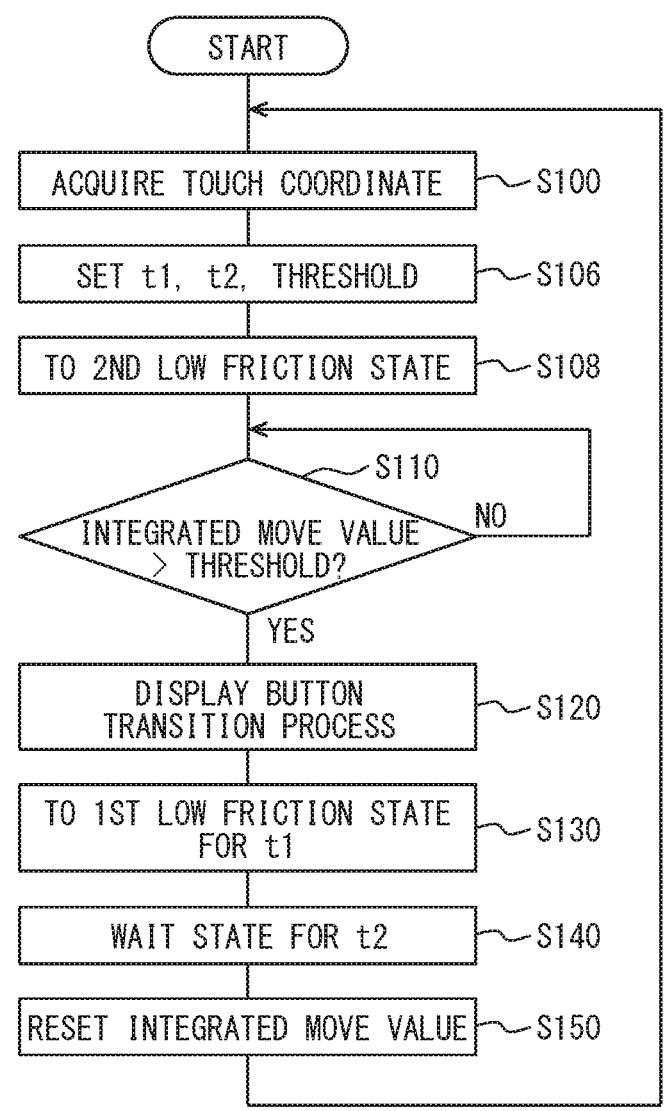
FIG. 16 is a flowchart showing a control according to the third embodiment.

The following will describe the control by the controller 130 in the present embodiment with reference to FIG. 16. Note that the flowchart shown in FIG. 16 corresponds to the flowchart shown in FIG. 4 in which S106 and S108 are added between S100 and S110. Therefore, S106 and S108 which are the differences from the first embodiment will be mainly described.

First, as illustrated in FIG. 16, the controller 130 acquires the touch position of the finger F in S100, and then proceeds to S106. In S106, the controller 130 sets predetermined times t1 and t2 and a movement determination threshold value, and proceeds to S108.

Subsequently, in S108, the controller 130 performs a control of driving the driver 120 to shift the manipulation surface 111 to the second low friction state where the stationary frictional force F4 is at least smaller than the moving frictional force F3 in the high friction state. Then, the controller 130 proceeds to S110.

When an affirmative determination is made in S110, the controller 130 sequentially proceeds with the processing after S120. In S130, the controller 130 drives the driver 120 in the same manner as described in the first embodiment. Here, the state of the manipulation surface 111 at this time corresponds to the first low friction state. On the other hand, when a negative determination is made in S110, the controller 130 repeats S110.

In the present embodiment, the controller 130 controls the second low friction state in addition to the first low friction state by the control described above. This can provide an effect to allow the manipulator to stop the finger F correctly even after the manipulation surface 111 transfers from the first low friction state to the high friction state.

Modification Example of Third Embodiment

The third embodiment describes an example where the controller 130 first drives the driver 120 after the touch position of the finger F on the manipulation surface 111 is detected and thereby places the manipulation surface 111 in the second low friction state. However, the present embodiment is not limited to this, and the controller 130 may drive the driver 120 before the manipulator places the finger F on the manipulation surface 111 and thereby places the manipulation surface 111 in the second low friction state.

Figure 17:
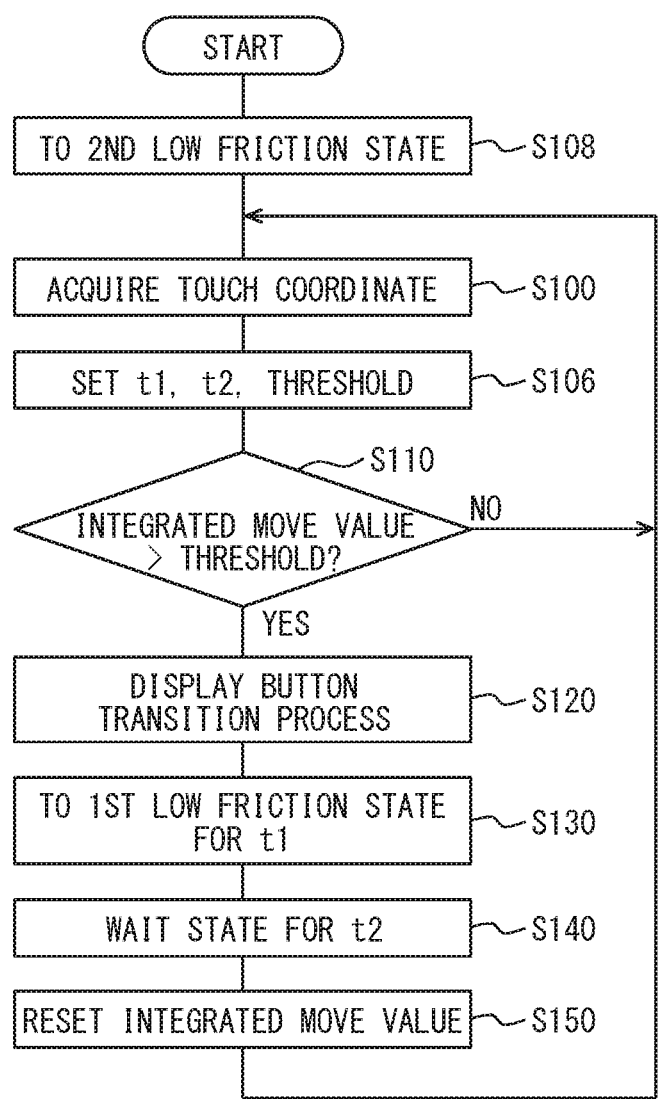
FIG. 17 is a flowchart showing a control according to a modification example of the third embodiment.

In this case, the controller 130 executes a control as shown in FIG. 17. The flowchart shown in FIG. 17 is different from the flowchart of FIG. 16 in that S108 is executed before S100, and the process returns to S100 when a negative determination is made in S110.

For example, in the present modification example, the controller 130 drives the driver 120 at a predetermined timing after the input apparatus is turned on, and causes the manipulation surface 111 to be in the second low friction state. Then, when the manipulator places the finger F on the manipulation surface 111, the controller 130 executes the processing after S100. Also by this modification example, the same effect as the third embodiment can be obtained.

According to the present embodiment, in addition to the effect of the first embodiment, the manipulator can easily stop the finger F in the target area after recalling the feeling of pulling-in, and the input apparatus can provide a more stable manipulation feeling. Needless to say, the controller 130 may be configured to determine the predetermined times t1 and t2 and the movement determination threshold value according to the moving speed of the finger F in the second embodiment while controlling the second low friction state.

Other Embodiments

Although the present disclosure has been described with reference to the embodiments, it is understood that the present disclosure is not limited to the embodiments and their structures. The present disclosure includes various modification examples and modifications within an equivalent range. In addition, various combinations and forms, as well as other combinations and forms including only one element, more or less, are within the scope and spirit of the present disclosure.

(1) The controller 130 and its method described in the present disclosure may be achieved by at least one special purposed computer that is provided by configuring a processor and a memory programmed to execute one or more functions embodied by a computer program. Alternatively, the controller 130 and its method described in the present disclosure may be achieved by at least one special purposed computer that is provided by configuring a processor with one or more dedicated hardware logic circuits. Alternatively, the controller 130 and its method described in the present disclosure may be achieved by at least one special purposed computer that is provided by a combination of a processor and a memory programmed to execute one or more functions and a processor configured by one or more hardware logic circuits. In other words, the functions provided by the controller 130 may be achieved by (i) at least one CPU along with memory storing instructions executed by the CPU, or (ii) hardware circuitry including dedicated hardware logic circuits with no CPU, or (iii) a combination of the at least one CPU along with memory and the hardware circuitry. The computer program may be stored, as instructions to be executed by a computer, in a tangible non-transitory computer-readable storage medium.

(2) In each of the above embodiments, the controller 130 drives the driver 120 to generate ultrasonic vibration in a direction orthogonal to the manipulation surface 111 and performs the pulling-in control by the squeeze effect. There is no need to be limited to this. For example, the controller 130 may generate a vibration that reciprocates in the direction in which the finger F moves in a direction in which the surface expands with respect to the manipulation surface 111. The pulling-in action may be generated such that the speed or acceleration of vibration on the forward path side where the finger F moves is smaller than that on the return path side where the finger F moves. Specifically, on the vibration on the return path side, the frictional force between the finger F and the manipulation surface 111 is small, and the finger F is left on the spot without moving. In contrast, the frictional force between the finger F and the manipulation surface 111 is increased on the vibration on the forward path side, and the finger F is moved together with the manipulation surface 111. By repeating this movement, the finger F can be pulled in the moving direction.

(3) Each of the above embodiments describes an example which adopts a so-called touch pad type as the manipulation device 110. There is no need to be limited to this. Another example may adopt, as the manipulation device 110 performing a rotation manipulation or a slider manipulation, a so-called touch panel type in which the display screen 52 of the liquid crystal display 51 is transmitted and visually recognized on the manipulation surface 111.

(4) In each of the above embodiments, the manipulating body is described as the manipulator's finger F. There is no need to be limited to this. A stick imitating a pen may be employed as a manipulating body.

(5) Each of the above embodiments describes a navigation apparatus 50 as an example of the predetermined apparatus that is the target of input control by the input apparatus 100. Without being limited thereto, the present disclosure can also be applied to other apparatuses such as a vehicle air conditioner or a vehicle audio apparatus.

For reference to further explain features of the present disclosure, the description is added as follows.

There is known an input apparatus configured to reduce the frictional force in the peripheral area, and remind the manipulator of a "feeling of pulling-in" such that a finger is pulled toward the target area in cases where the manipulator performs a finger manipulation so as to pass from the non-peripheral area to the target area through the peripheral area.

Even in such a known input apparatus, the finger moving speed or coefficient of friction when the manipulator performs finger manipulation is variable depending on person to person and other factors. The other factors include (i) environments such as temperature and humidity during finger manipulation, and (ii) manipulation states such as manipulation during driving, rush manipulation, or accustomed manipulation. For this reason, there are individual differences in (i) the pull-in feeling obtained by the vibration of the manipulation surface or (ii) the time until the finger is stopped on the target area after passing through the peripheral area where the feeling of pulling-in is obtained. As a result, the position where the finger is stopped after the pulling-in action may deviate from the expected position in the target area, for example, the center position. In such a case, there is arising a difference in manipulation feeling. For instance, the time from when the manipulator starts the next finger manipulation to when the next feeling of pulling-in is obtained may be felt short or long.

It is thus desired to provide an input apparatus which reduces a difference in manipulation feeling when a manipulator performs a finger manipulation as compared with a related art while giving a feeling of pulling-in.

Aspects of the present disclosure described herein are set forth in the following clauses.

According to an aspect of the present disclosure, an input apparatus is provided to include (i) a manipulation device including a manipulation surface manipulated by a manipulator, (ii) a detector configured to detect a manipulation state of a manipulating body with respect to the manipulation surface, (iii) a driver configured to vibrate the manipulation surface, and (iv) a controller configured to control the driver to vibrate the manipulation surface and perform an input to a predetermined apparatus according to the manipulation state detected by the detector. Herein, the predetermined apparatus includes a display configured to display a plurality of manipulation buttons; any one of the manipulation buttons is selected as a selection position and a change in the selection position is associated with a change in a coordinate position of the manipulating body on the manipulation surface. Further, in response to determining that the selection position on the display moves from a one of the manipulation buttons to a different one of the manipulation buttons due to a movement of the manipulating body on the manipulation surface, the controller is configured to perform using the driver a first low friction control to cause the manipulate surface to be in a first low friction state by a predetermined time. Herein, the first low friction state is where a first low frictional force between the manipulation surface and the manipulating body is provided due to generation of a predetermined first vibration on the manipulation surface; the first low frictional force is smaller than a non-vibration frictional force between the manipulation surface and the manipulating body in a non-vibration state where no vibration is generated on the manipulation surface. Yet further, under a state where a contact of the manipulating body to the manipulation surface is detected by the detector, the controller is further configured to perform, before the movement of the manipulating body on the manipulation surface, using the driver a second low friction control to cause the manipulation surface to be in a second low friction state. Herein, the second low friction state is where a second low frictional force between the manipulation surface and the manipulating body is provided due to generation of a predetermined second vibration on the manipulation surface; the second low frictional force is smaller than the non-vibration frictional force in the non-vibration state where no vibration is generated on the manipulation surface, and larger than the first low frictional force in the first low friction state.

The above configuration can provide an input apparatus in which the controller vibrates the driver for a predetermined time when it is determined that a predetermined manipulation has been performed and thereby causes the manipulation surface to be in a first low friction state in which the frictional force with the manipulating body is smaller than the frictional force in a state where no vibration is generated on the manipulation surface. Therefore, regardless of the position of the manipulating body on the manipulation surface, a predetermined vibration is generated for a predetermined time at the timing when the manipulating body moves. The manipulation surface is thereby controlled to be in a first low friction state that reminds the manipulator of the feeling of pulling-in. Therefore, a feeling of pulling-in is obtained according to the movement of the manipulating body, to thereby provide an effect that a stable manipulating feeling can be obtained without giving an uncomfortable feeling to the manipulator.

In addition, before the manipulating body contacting the manipulation surface starts to move, the controller controls the manipulation surface by using the driver such that the manipulation surface comes to be in a second low friction state in which the frictional force with the manipulating body is smaller than the frictional force in a state where no vibration is generated on the manipulation surface and larger than that in the first low friction state. Such a second low friction state can suppress the finger from hardly stopping in the high friction state where the driver is stopped after the first low friction state, thereby providing a more stable manipulation feeling.

What is claimed is:

1. An input apparatus separate from and coupled to a predetermined apparatus including a display, the input apparatus comprising:
   a manipulation device including a manipulation surface manipulated by a manipulator;
   a detector configured to detect a manipulation state of a manipulating body with respect to the manipulation surface;

a driver configured to vibrate the manipulation surface; and a controller configured to control the driver to vibrate the manipulation surface and perform an input to the predetermined apparatus according to the manipulation state detected by the detector, wherein the display in the predetermined apparatus is configured to display a plurality of manipulation buttons, and wherein any one of the manipulation buttons is selected as a selection position on the display and a change in the selection position is associated with a change in a coordinate position that is a position of the manipulating body on the manipulation surface, wherein:

in response to determining that the selection position on the display has started to move from a first manipulation button of the manipulation buttons toward a second manipulation button of the manipulation buttons due to a start of movement of the manipulating body on the manipulation surface, regardless of the coordinate position of the manipulating body on the manipulation surface, the controller is further configured to perform, using the driver, a first low friction control to cause the manipulation surface to be in a first low friction state for a predetermined time, the first low friction state being where a first low frictional force between the manipulation surface and the manipulating body is provided due to generation of a predetermined first vibration on the manipulation surface, and the first low frictional force being smaller than a non-vibration frictional force between the manipulation surface and the manipulating body in a non-vibration state where no vibration is generated on the manipulation surface; and under a state where a contact of the manipulating body on the manipulation surface is detected by the detector while the first manipulation button is selected as the selection position on the display, the controller is further configured to perform, before the movement of the manipulating body on the manipulation surface and using the driver, a second low friction control to cause the manipulation surface to be in a second low friction state, the second low friction state being where a second low frictional force between the manipulation surface and the manipulating body is provided due to generation of a predetermined second vibration on the manipulation surface, and the second low frictional force being smaller than the non-vibration frictional force in the non-vibration state where no vibration is generated on the manipulation surface, and larger than the first low frictional force in the first low friction state, and wherein the controller is further configured to control the driver so that the second low friction state, the first low friction state, and the non-vibration state are performed sequentially wherein the controller is further configured to set sizes of the plurality of manipulation buttons to be smaller in response to a moving speed of the manipulating body on the manipulation surface increasing.

2. The input apparatus according to claim 1, wherein after the predetermined time elapses under the first low friction state, the controller is further configured to generate, using the driver, a vibration different from the predetermined first vibration on the manipulation surface.

3. The input apparatus according to claim 1, wherein after the predetermined time elapses under the first low friction state, the controller is further configured to determine the coordinate position of the manipulating body on the manipulation surface to correspond to the second manipulation button that is reached after the movement of the manipulating body according to a pressing force of the manipulating body on the manipulation surface.

4. The input apparatus according to claim 1, wherein the controller is further configured to set the predetermined time to be smaller in response to a moving speed of the manipulating body on the manipulation surface increasing.

5. The input apparatus according to claim 1, wherein the controller is further configured to set a determination threshold value for determining the movement of the manipulating body to be smaller in response to a moving speed of the manipulating body on the manipulation surface increasing.

6. The input apparatus according to claim 1, wherein the controller is further configured to set an amplitude of the predetermined first vibration to be smaller in response to a moving speed of the manipulating body on the manipulation surface increasing.

7. The input apparatus according to claim 1, wherein in response to the detector detecting the contact of the manipulating body on the manipulation surface, the controller is further configured to begin controlling the manipulation surface to be in the second low friction state.

8. The input apparatus according to claim 1, wherein before the detector detects the contact of the manipulating body on the manipulation surface, the controller is further configured to begin controlling the manipulation surface to be in the second low friction state.

9. The input apparatus according to claim 1, wherein in response to determining that the selection position on the display has started to move from the first manipulation button toward the second manipulation button, the controller is further configured to perform the first low friction control by the predetermined time while changing the selection position on the display from the first manipulation button to the second manipulation button; and in response to determining that the movement of the manipulating body is stopped to locate the coordinate position of the manipulating body at a position on the manipulation surface during the non-vibration state following the first low friction state, the controller is further configured to determine that the position at which the coordinate position of the manipulating body is located on the manipulation surface corresponds to the second manipulation button on the display.

10. An input apparatus coupled via a communication link to a predetermined apparatus including a display, the input apparatus comprising:

a manipulation device including a manipulation surface separate from the display;

a detector configured to detect a manipulation state including a touch position of a manipulating body, the touch position being a position at which the manipulating body touches the manipulation surface;

a driver configured to vibrate the manipulation surface; and a controller configured to control the driver and perform an input to the display that displays a plurality of manipulation buttons based on the manipulation state, wherein the controller is further configured to control the driver to sequentially (i) vibrate in a second low friction state to provide a second low frictional force between the manipulation surface and the manipulating body, in response to the detector detecting a touch of the manipulating body on the manipulation surface while a first manipulation button of the plurality of manipulation buttons is selected as a selection position on the display, (ii) vibrate in a first low friction state for a predetermined time to provide a first low frictional force between the manipulation surface and the manipulating body, in response to determining that a movement of the manipulating body on the manipulation surface has started under the second low friction state, regardless of the touch position of the manipulating body on the manipulation surface, the first low frictional force being smaller than the second low frictional force, and (iii) stop vibrating the manipulation surface and enter a non-vibration state to provide a non-vibration frictional force between the manipulation surface and the manipulating body, in response to the first low friction state ending after the predetermined time elapses, the non-vibration frictional force being larger than the second low frictional force wherein the controller is further configured to set sizes of the plurality of manipulation buttons to be smaller in response to a moving speed of the manipulating body on the manipulation surface increasing.

11. The input apparatus according to claim 10, wherein in response to determining that the movement of the manipulating body on the manipulation surface has started, the controller is further configured to control the driver to vibrate in the first low friction state while changing the selection position on the display from the first manipulation button to a second manipulation button, the second manipulation button being adjacent to the first manipulation button in a direction corresponding to the movement of the manipulating body, and wherein in response to determining that the movement of the manipulating body is stopped to locate the touch position of the manipulating body at a positon on the manipulation surface during the non-vibration state, the controller is further configured to determine the position at which the touch position of the manipulating body is located corresponds to the second manipulation button on the display.

12. The input apparatus according to claim 10, wherein the controller is further configured to control the driver to be in the first low friction state for the predetermined time by controlling the driver to generate a predetermined first vibration on the manipulation surface, and after the predetermined time elapses, the controller is further configured to generate, using the driver, a vibration different from the predetermined first vibration on the manipulation surface.

13. The input apparatus according to claim 10, wherein during the non-vibration state, the controller is further configured to determine a position on the manipulation surface at which the movement of the manipulating body is stopped to correspond to a second manipulation button adjacent to the first manipulation button in a direction corresponding to the movement of the manipulating body, based on a pressing force of the manipulating body on the manipulation surface.

14. The input apparatus according to claim 10, wherein the controller is further configured to set the predetermined time to be smaller in response to a speed of the manipulating body on the manipulation surface increasing.

15. The input apparatus according to claim 10, wherein the controller is further configured to set a determination threshold value for determining the movement of the manipulating body to be smaller in response to a moving speed of the manipulating body on the manipulation surface increasing.

16. The input apparatus according to claim 10, wherein the controller is further configured to set an amplitude of a vibration generated by the driver under the first low friction state to be smaller in response to a moving speed of the manipulating body on the manipulation surface increasing.

17. The input apparatus according to claim 10, wherein in response the detector detecting the touch of the manipulating body on the manipulation surface, the controller is further configured to control the driver to begin the second low friction state.

18. The input apparatus according to claim 10, wherein before the detector detects the touch of the manipulating body on the manipulation surface, the controller is further configured to control the driver to begin the second low friction state.

* * * * *